No. 720,682. PATENTED FEB. 17, 1903.
C. S. DOLLEY.
SIPHON BOTTLE FILLER.
APPLICATION FILED MAY 20, 1902.
NO MODEL.
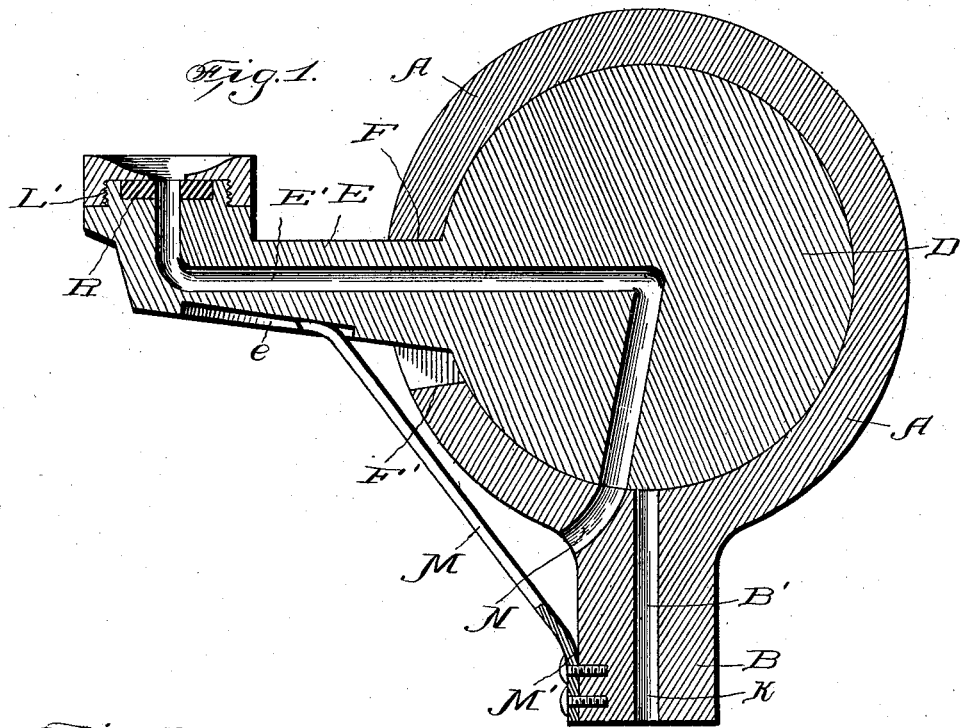
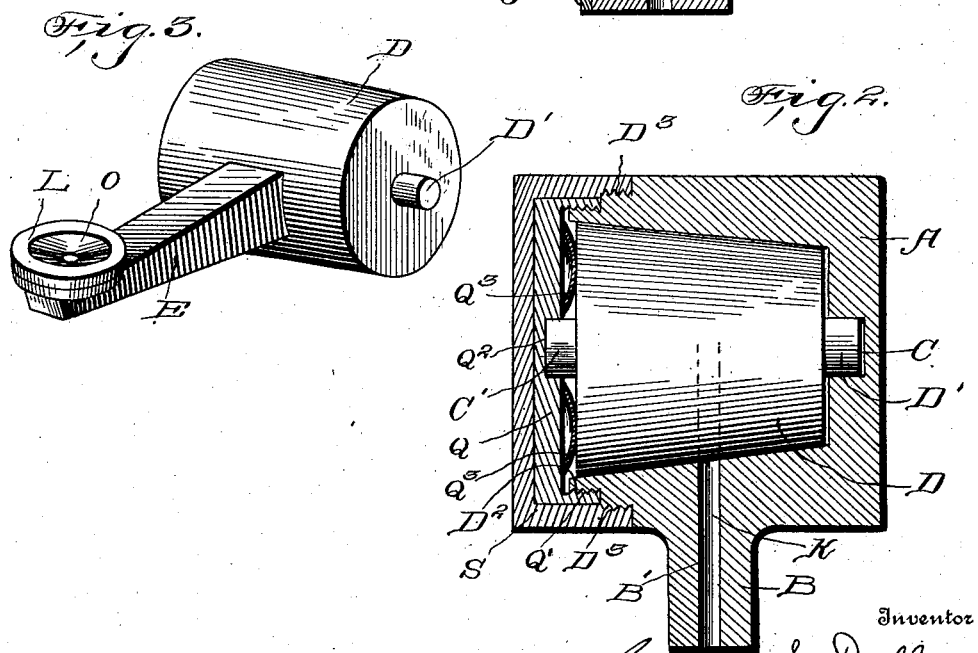
Witnesses
R. A. Boswell
Inventor
Charles S. Dolley,
By Franklin H. Hough
Attorney

UNITED STATES PATENT OFFICE.

CHARLES SUMNER DOLLEY, OF PHILADELPHIA, PENNSYLVANIA.

SIPHON-BOTTLE FILLER.

SPECIFICATION forming part of Letters Patent No. 720,682, dated February 17, 1903.

Application filed May 20, 1902. Serial No. 108,247. (No model.)

*To all whom it may concern:*

Be it known that I, CHARLES SUMNER DOLLEY, a citizen of the United States, residing at Philadelphia, in the county of Philadelphia and State of Pennsylvania, have invented certain new and useful Improvements in Siphon-Bottle Fillers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in siphon-bottle-filling apparatus; and it consists in the provision of a suitable casing or shell adapted for communication with a tank holding aerated liquids and provided with a conical-shaped turning-plug therein, which has a bearing at one end in a recess in the casing and its other end journaled in a recessed cap screwed to the shell or casing, and in the provision of a spring-pressed arm, which may be integral with or secured to the turning-plug, and having a cup at the outer end of the arm in which the nose of the siphon is inserted preparatory to the arm being depressed, whereby communication may be had between the storage-tank and the bottle to be filled, means being provided whereby the supply of aerated liquid is automatically cut off and the gas and water remaining in the filling arm and cup allowed to sniff to the atmosphere.

The invention consists, further, in various details of construction, arrangements, and combinations of parts, as will be hereinafter fully described and then specifically defined in the appended claims.

My invention is clearly illustrated in the accompanying drawings, which, with the letters of reference marked thereon, form a part of this application, and in which drawings similar letters of reference indicate like parts in the views, in which—

Figure 1 is a transverse sectional view through an apparatus embodying the features of my invention. Fig. 2 is a sectional view taken at right angles to the view shown in Fig. 1. Fig. 3 is a detail view of the turning-plug and the filling-arm with cup carried at the end thereof.

Reference now being had to the details of the drawings by letter, A designates a shell or casing, which may be of any desired shape and mounted on a hollow standard B, having a central duct B' passing through the same and opening into the chambered portion of said shell or casing. The inner wall of said shell or casing is recessed, as at C, to form a bearing for a lug D', which is integral with the conical-shaped turning-plug D. Said turning-plug is provided with an arm E, which is hollow and may be integral with or secured to said plug and is allowed to rock with the turning-plug and limited in its movement in opposite directions by means of the shoulders F and F', which are formed by cutting away a portion of the wall of the shell or casing. The duct E', which runs longitudinally and centrally through said arm, extends to the center of the plug and thence turns with an angle and opens through the circumference of the turning-plug at any suitable location, and when said arm is thrown to its lowest position the portion of the duct which opens through the circumference of the plug is adapted to register with the passage-way K in the standard or support for the casing, which latter passage-way K is adapted to communicate with a source of supply of the aerated liquid. A port N is formed in the wall of said casing or shell at any suitable location intermediate the passage-way K and the rocking arm, which is provided for the purpose of allowing the liquid or gas which remains in the duct in the plug and arm to sniff to the atmosphere when the filling-arm E is thrown to its highest position against a shoulder F, in which position communication between the filling-arm and the passage-way K is closed.

In order to normally hold the filling-arm at its highest position, a spring M is provided, which is secured at its lower end at M' to the neck of the shell, and its free end has a sliding movement against the under side of the arm E in a recess $e$. Fitted over the outer upturned end of said arm, through which the duct in said arm leads, is a cup L, having a central bore, the wall of which is threaded to fit the threads of a shoulder L'. A suitable washer R is adapted to rest on the upturned end of said arm within the threaded shoulder, and the cup is provided, preferably, with a flexible disk O, through the central aperture of which the end of a siphon-bottle is adapted to be passed and to be held against said washer.

In order to hold the turning-plug D in place within the casing, a cap Q is provided, which has internal threads Q' upon its flange designed to fit the left-hand threads formed upon the shoulder $D^2$ of said casing or shell. The inner face of the cap Q is centrally recessed, as at $Q^2$, to form a bearing for the lug C', which is integral with the turning-plug, and a spring-disk $Q^3$ is interposed between the enlarged end of the turning-plug and the inner face of said cap Q for the purpose of holding the plug securely in place within the shell. A second cap S is provided, having right-handed threads on the inner circumference of its flange which are adapted to fit over similarly-arranged threads on a second shoulder $D^3$ upon said shell or casing, said cap S being provided for the purpose of securely holding the cap Q from becoming loosened from the threaded shoulder $D^2$ on the shell.

The operation of my device will be readily understood and is as follows: The end of the siphon-tube being first inserted through the flexible diaphragm and against the washer at the outer end of the filling-arm, the latter is depressed against the tension of the spring M, and when the end of the duct passing through the filling-arm and the turning-plug comes into registration with the passage-way K, leading to the supply of aerated liquid, the latter will be forced up through the duct in the filling-arm and into the siphon-bottle. When the bottle is filled and pressure is released from the filling-arm, the latter will be thrown by the spring into a substantially horizontal position, and communication will be cut off between passage-way K and the duct E' in the turning-plug, and the inlet end to the duct leading into the turning-plug will come into registration with the port N, and the remaining liquid and gas in the port E and the filling-arm will be allowed to sniff to the atmosphere.

Having thus fully described my invention, what I claim as new, and desire to secure by Letters Patent, is—

1. A siphon-filling apparatus comprising a casing, a tapering plug with lugs projecting from the ends thereof, a cap, recesses in said casing and cap in which said lugs have bearings, and an integral spring-actuated filling-arm on the plug passing through an aperture in the wall of the casing and having a duct passing through the same and said plug, as set forth.

2. A siphon-filling apparatus, comprising a casing or shell, a turning-plug having a bearing at one end in said shell, a cap having a left-handed threaded flange fitted on the casing and in which the opposite end of said plug has a bearing, a second cap with a flange, having right-handed threads, fitted over the other cap, a filling-arm carried by the plug and having a play in a cut-away portion of the casing and provided with a duct passing through said plug and designed to communicate with a passage-way leading to a supply-reservoir, as set forth.

In testimony whereof I affix my signature in presence of two witnesses.

CHARLES SUMNER DOLLEY.

Witnesses:
HARRY G. HUNDERMARK,
WILLIAM E. STOKES.